United States Patent
Kau

(10) Patent No.: US 6,380,526 B1
(45) Date of Patent: Apr. 30, 2002

(54) EMPLOYING BOOSTER TRAJECTORY IN A PAYLOAD INERTIAL MEASUREMENT UNIT

(75) Inventor: Shing Peter Kau, Seminole, FL (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/644,728

(22) Filed: Aug. 23, 2000

(51) Int. Cl.[7] ................................................ F41G 7/00
(52) U.S. Cl. .................. 244/3.2; 244/158 R; 244/63; 701/13; 701/220; 701/226
(58) Field of Search .................. 244/3.1, 3.15, 244/3.2, 158 R, 63; 701/4, 13, 220, 226

(56) References Cited

U.S. PATENT DOCUMENTS

| | | | | |
|---|---|---|---|---|
| 3,652,042 A | * | 3/1972 | Welther | 244/172 |
| 4,614,318 A | * | 9/1986 | Gobel | 244/3.21 |
| 4,964,340 A | * | 10/1990 | Daniels et al. | 244/172 |
| 5,150,856 A | * | 9/1992 | Gaide | 244/3.2 |
| 5,927,653 A | * | 7/1999 | Mueller et al. | 244/172 |
| 5,948,045 A | * | 9/1999 | Reiner | 244/3.2 |

* cited by examiner

Primary Examiner—J. Woodrow Eldred
(74) Attorney, Agent, or Firm—Robert E. Greenstien

(57) ABSTRACT

A payload launching method measures the attitude of a booster during a launch with an inertial measurement unit on the payload to compare the actual booster trajectory with a desired trajectory to control the payload at the deployment location, the inertial measurement unit on a booster carrying the payload using said desired trajectory to reach the deployment location

5 Claims, 2 Drawing Sheets

EMPLOYING BOOSTER TRAJECTORY IN A PAYLOAD INERTIAL MEASUREMENT UNIT

BACKGROUND

This invention relates to the use of booster rockets to launch payloads, in particular, employing booster trajectory in the operation of the payload inertial measurement (IMU) unit during the launch for attitude determination.

As a practical matter, booster rockets are simply delivery trucks to carry any payload into space to a location (deployment location) where the payload begins its mission, separating from the booster upper stage to return to earth or enter into orbit under its own power. The booster is launched from a location employing an on-board IMU that uses a flight computer and data, defining the planned or desired booster trajectory to the deployment location, to compare the sensed or actual trajectory, measured by the IMU, with the desired trajectory. The error is used to generate a correction to the booster's path to narrow the error over time. More specifically, first the actual trajectory, derived from the booster IMU measurement, is compared against a desired trajectory to compute the trajectory dispersion. Control actions are issued to steer the booster in a manner to nullify the dispersion. The control actions may be implemented using rocket thrusters or aerodynamic control surfaces, e.g. fins. As the time to deliver the payload to the deployment location gets closer, the control action becomes more intense so that the actual booster trajectory converges with the desired trajectory at a faster pace to assure accurate payload deployment. When the booster is off course from the desired trajectory, the guidance will issue a control action to steer it back. A positive position dispersion will be corrected with negative velocity dispersion of proper magnitude to zero out the dispersion in the expected to time go for payload deployment and vice versa. Mathematically, this is reflected in a dispersion covariance matrix to have appropriate negative correlation between the position and velocity dispersions. The dispersion covariance diminishes as the booster flies closer to the deployment time, reflecting the heightened guidance action.

Payload navigation error is the result of integrating the payload IMU measurement using an erroneous attitude. Like shooting an arrow with an aiming error, the trajectory will diverge from the target. The arrow will stay off course and never change its direction. Also, the error increases with flying time. Mathematically, this is manifested in the navigation error covariance matrix to have positive correlation between the position and velocity errors. The error covariance increases with the time of flight.

The payload rides on the upper stage of the booster and its IMU operates during the boost flight to provide an attitude solution for the payload's mission that starts after deployment. It does not control booster attitude. Payloads that simply reenter the atmosphere, may not have an IMU or their own propulsion devices. But payloads that may move to a higher orbit or reenter with down stream maneuvers need an IMU to compute the attitude solution to operate on-board rockets and thrusters or other means of flight control.

If the payload carries an IMU and it communicates with the booster IMU, the payload attitude can be established by comparing the measurements from the two IMUs. Since both IMUs are flying on the same booster, the measurements should match, after accounting for their different locations on the booster and their relative orientations. But in practice the two IMUs do not communicate because that is extremely complicated for several reasons. A booster model can be used to launch an assortment of different payloads from different manufacturers, with different missions and different IMUs and communication protocols. It is not uncommon that the booster is decades older than a new satellite or other space craft and technologically incompatible. Therefore, when the payload arrives at the deployment point it has produce the attitude solution on its own, frequently by looking at the earth with earth sensors or the stars with star sensors, or sun with sun sensors. In other words, the payload IMU needs to determine where it is pointing to begin the mission without any help from the booster's IMU.

The payload IMU may contain star or earth sensors, in addition to gyros and accelerometers for direct measurement of payload motion. The payload, for instance a satellite, has rockets and thrusters, which are controlled as a function of the attitude solution (the correction orientation for a desired trajectory or reenter.)

SUMMARY OF THE INVENTION

An object of the invention is to provide a payload IMU that accurately knows the payload attitude at deployment without the use of star, sun or earth sensors or in-flight communication with the booster IMU, which would improve the speed in attitude solution acquisition and reduce the weight, cost and complexity of the IMU.

According to the invention, the payload IMU generates an independent measurement of the booster trajectory during flight. Gyro and accelerometer measurement are integrated using an assumed IMU attitude to construct the booster trajectory independently of the booster IMU. The payload is compared against a desired trajectory that is stored in the memory of the payload IMU processor.

According to the invention, a payload IMU independently tracks the booster path using the same planned booster trajectory data, but separately stored in the payload IMU, to independently arrive at the payloads attitude solution after deployment.

According to the invention, the payload IMU computer contains the trajectory plan used by the booster's IMU. The computer also includes the comparison routines, e.g. Kalman filter, for that task During the flight the payload IMU measures the motion of the booster and compares the measurement to the planned trajectory so that payload, in effect emulates, the booster IMU in so far as it knows the trajectory to its deployment point to compute the attitude solution for the mission. In other words as done on the booster IMU, the payload IMU uses a payload attitude determination algorithm that operates on the trajectory difference or error to separate the component of trajectory dispersion from that of navigation error caused by payload IMU's attitude error. This is accomplished, in the payload IMU during flight, with the use of a math model governing the statistics of the trajectory dispersion and a math model governing the effect of attitude error in trajectory. These math models, which are known, are used in the payload IMU processor as the trajectory dispersion covariance matrix and the navigation error covariance matrix, which exhibit totally different characteristics. The attitude determination algorithm takes the difference between the payload IMU computed trajectory and the stored, desired trajectory and use statistical models to separate the trajectory dispersion from the effect of the attitude error. Once separated, the effect of attitude error is processed to back out the payload IMU attitude error and complete the operation of attitude determination, in the form of a Kalman filter.

A feature of the invention is that the payload IMU knows the deployment point as accurately as the booster without any communications between the two IMUs. Another feature is that the payload is lighter and less expensive because star and earth sensors are not needed. It can reduce the cost of the payload since the trajectory information and related comparison functions can be programmed into the on board computer. The invention can be used with multiple payloads on a upper stage bus, so that each can be separately deployed. Each payload would include its own IMU designed, according to the invention, to track the booster trajectory up to the moment of deployment. Another feature, deployment can be faster because the payload's attitude solution can be computed throughout the launch, to be ready for deployment.

Other objects, benefits and features of the invention will be apparent to one of ordinary skill in the art from the drawing and following description.

DESCRIPTION

Figure 1:
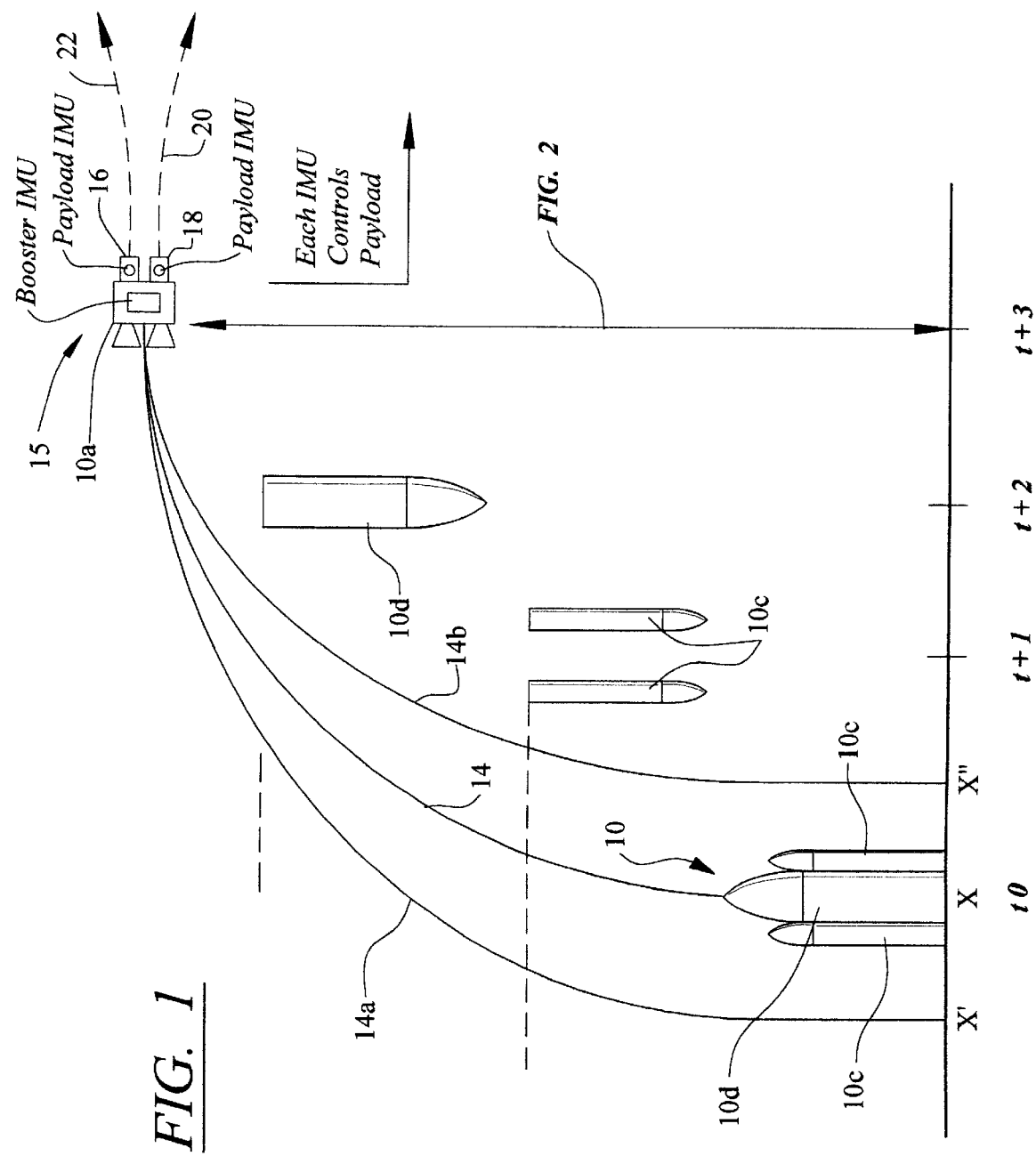
FIG. 1 shows a booster launch and payload sequence.

In FIG. 1, a booster rocket 10 is shown at a launch location X, within a possible range between locations X', X". The booster 10 should be assumed to include the standard booster IMU described above in its upper or final stage 10a and a stored program for the desired flight trajectory 14 and related programs or signal processing routines to adjust the launch or flight trajectory to follow trajectory 14 from trajectories 14a, 14b or any intermediate trajectory. The program include a guidance law, known in the prior art, where it is used to bring the actual flight closer to trajectory 14 as the flight progresses from t0 to t+3, when the deployment location 15 is reached by the upper stage 10a. During the launch the first 10c and second stages 10d deploy. The payloads 16, 18, each having its own IMU, are carried on the third stage 10a. At the time of deployment, the payload IMUs take over, controlling their respective thrusters to launch into different trajectories 20, 22. This uses the IMU on each payload. The payload IMUs include functionally the same components as the booster IMU in general, such as a signal processor or computer, which is well know and not shown. But as compared to the prior art, the payload computers include a program to measure the booster trajectory until deployment that includes a Kalman filter to blend the actual trajectory, e.g. path 14, data obtained from the gyros and accelerometers in the payload IMU, with the stored or desired trajectory, the same desired trajectory stored in the booster IMU, but also stored and used by each payload IMU during the flight to be ready to generate an appropriate attitude solution for deployment to orbit or reentry. Each payload 16, 18 therefore knows the deployment location because during the booster flight each payload IMU measures the actual booster trajectory and compares it with the desired trajectory independent of the booster IMU.

Figure 2:
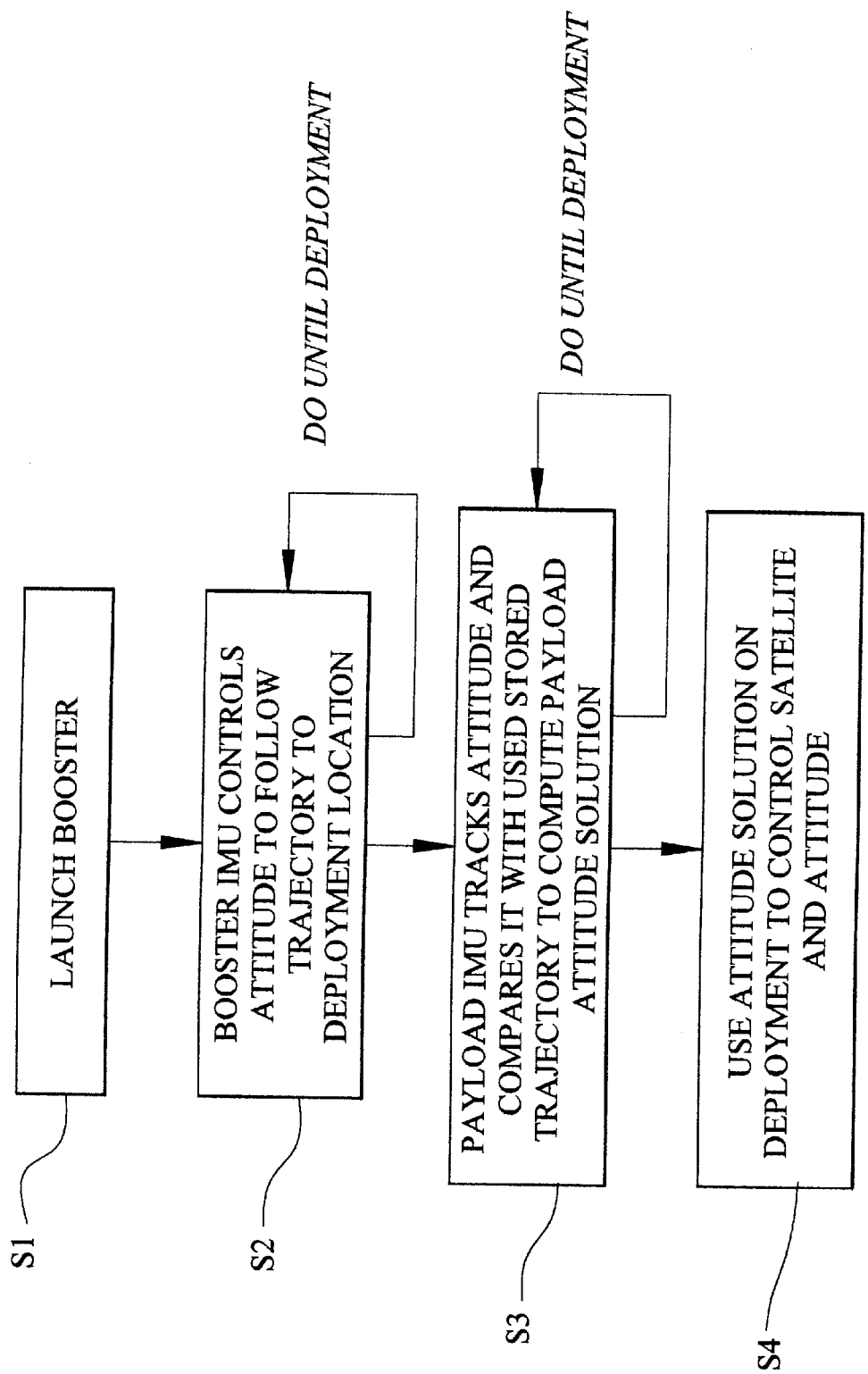
FIG. 2 is a block diagram of a method for deploying the payload according to the invention.

FIG. 2 shows a sequence embodying the invention. At step S1, the booster 10 is launched carrying the two payloads 16, 18, and at step S2 booster on-board guidance is controlled by the booster IMU, which compares the actual trajectory, which could be from X' or X" along trajectories 14a, 14b, to stored, desired trajectory 14 so that the booster follows a path between the two extremes 14a, 14b to the deployment location 15. At the same time, each payload 16, 18 IMU measures the booster's 10a path and compares it with the stored trajectory, which is programmed into each payload IMU. The payload IMUs continue this process to be able to compute their respective payload attitude solution at the time of deployment, after the upper or last booster stage 10a shuts down. Each payload IMU performs step S4 for its respective mission on one of the trajectories 20, 22.

One skilled in the art may make modifications, in whole or in part, to a described embodiment of the invention, its components and their functions without departing from the true scope and spirit of the invention.

What is claimed is:

1. A payload launching method, comprising:

using an inertial measurement unit on a booster to measure booster trajectory during a launch to determine booster location and running a routine stored on the inertial measurement unit that determines the difference between the actual trajectory and a desired trajectory to provide a booster trajectory solution to reach a desired payload deployment location; and using an inertial measurement unit on the payload to measure the booster trajectory during a launch to determine booster location and running said routine stored on the inertial measurement unit on the payload to determine the difference between the actual trajectory and a desired trajectory to provide a payload attitude solution to deploy the payload at said deployment location.

2. The method described in claim 1, wherein said routine includes a Kalman filter.

3. The method described in claim 2, wherein said routine reduces the difference between the actual booster trajectory and desired trajectory as the remaining time to deployment decreases.

4. A payload that is launched on a booster to a deployment location, the booster containing an inertial measurement unit to control the booster trajectory, comprising an inertial measurement unit on the payload that measures the trajectory of booster during the launch and compares the actual booster trajectory with a desired trajectory to control the payload at the deployment location, the inertial measurement unit on the booster using said desired trajectory to reach the deployment location.

5. A payload launching method, comprising:

measuring the trajectory of a booster carrying the payload during a launch with an inertial measurement unit on the payload to compare the actual booster trajectory with a desired trajectory to control the payload at the deployment location, and using an the inertial measurement unit on a the booster carrying the payload using to follow said desired trajectory to reach the deployment location.

* * * * *